Inventors
Allan V. Ditty
Arthur J. Bradford,
Attorneys

June 30, 1942.  A. V. DITTY ET AL  2,288,074
PHOTOGRAPHIC PROJECTION APPARATUS
Filed Feb. 8, 1940    2 Sheets-Sheet 2

Inventors
Allan V. Ditty
Arthur J. Bradford,

By
Attorneys

Patented June 30, 1942

2,288,074

UNITED STATES PATENT OFFICE 2,288,074

PHOTOGRAPHIC PROJECTION APPARATUS

Allan V. Ditty, Detroit, and Arthur J. Bradford, Grosse Pointe Park, Mich., assignors to Motion Picture Engineering Co., Detroit, Mich., a corporation of Michigan Application February 8, 1940, Serial No. 317,804

1 Claim. (Cl. 88—27)

This invention relates generally to photographic projection apparatus and more particularly to such apparatus of the character in which photographs are successively and continuously projected onto a screen.

It is an object of the present invention to provide a photographic projection apparatus having a new and improved arrangement of the parts thereof such that it may be inclosed in a minimum size casing.

Another object of the invention is to provide a new and improved compact, portable photographic projection apparatus.

Other objects of the invention will appear from the following description taken in connection with the accompanying drawings in which Figure 1 is a view in side elevation partly broken away and in section of our improved photographic projection apparatus;

Figure 1:
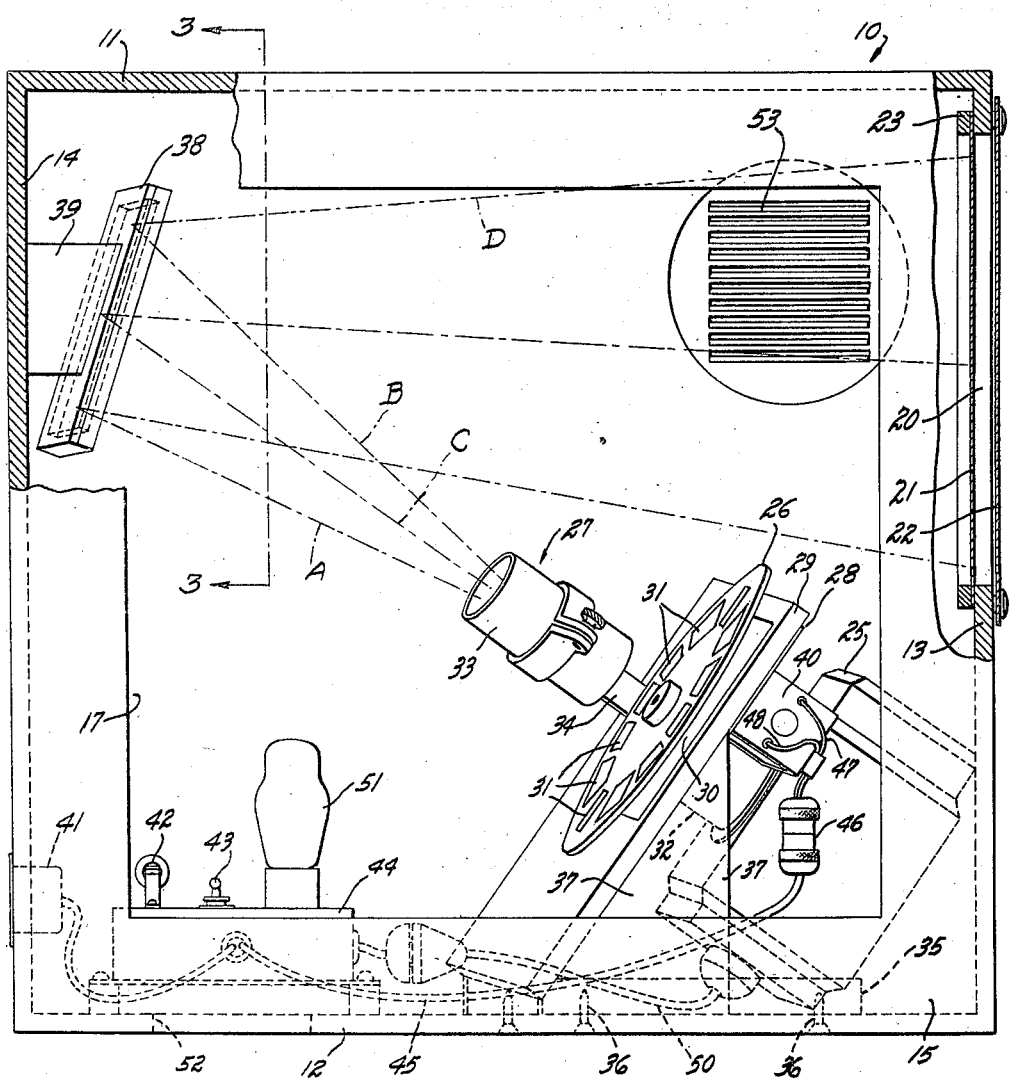

Referring to the drawings by characters of reference, the numeral 10 designates in general, a cabinet or casing of rectangular form for enclosing the photographic projection apparatus, the casing 10 having a top wall 11, bottom wall 12, front wall 13, rear wall 14 and side walls 15 and 16. In the casing side wall 15 an opening 17 is provided for access to the interior of the casing 10 and this opening is closed by a removable closure member or cover 18 which may be secured to the casing in any suitable manner. In the casing front wall 13, adjacent to the wall 11, a rectangular opening 20 is provided and is closed by a projection screen 21 which is preferably a translucent screen such that the photographs projected thereon will be visible on the external side of the screen. The opening 20 extends substantially entirely across the width of the screen so that the length of the exposed screen may be substantially the maximum length permitted by the width of the casing. The screen 21 is positioned within the casing 10 against the inner surface of the front wall 13 and is backed by a rectangular frame 23 which may be secured to the casing in any suitable manner. If desired, the screen 21 may be provided with an external protective covering 22 which may be rolled up or removed when the device is in operation.

Disposed within the casing 10, adjacent the bottom and front walls thereof, is a photographic projection apparatus comprising in general a light source or lamp 25, a photographic projection plate or film 26 and a focusing lens 27. The lamp 25, film plate 26 and the lens 27 are all mounted on a metallic supporting plate 28 which in turn is secured to one side of an upright mounting board 29 with which the devices of the apparatus are removable from the casing through the opening 17 as a unitary structure. The photographic plate or film support 26 is preferably a rotatable disc-like plate positioned slightly rearwardly of the mounting board 29 and may be mounted on a shaft 30, this disc being provided, adjacent its outer periphery, with a plurality of transparent photographs indicated at 31 for successive and continuous projection on the screen 21. The lamp 25 is mounted on the front of the mounting board 29 and has a reduced and extended casing portion 32 having an opening (not shown) for the light rays, said opening being arranged to align with the transparent photographs 31 of the plate 26 in close proximity thereto. The focusing lens 27 is mounted rearwardly of the plate in spaced relation thereto and is contained in an open ended metallic tube 33 rigidly mounted on the supporting plate 28 by a bracket 34, the lens 27 being arranged off-center of the plate 26 for aligning with the photographs 31 and the light source and therefore is offset from the center of the screen 21. The mounting board 29 may be supported on a horizontal base 35 secured to the casing bottom wall 12 by screws 36 or by other suitable means and may be braced by spaced, end angle members 37.

Figure 2:
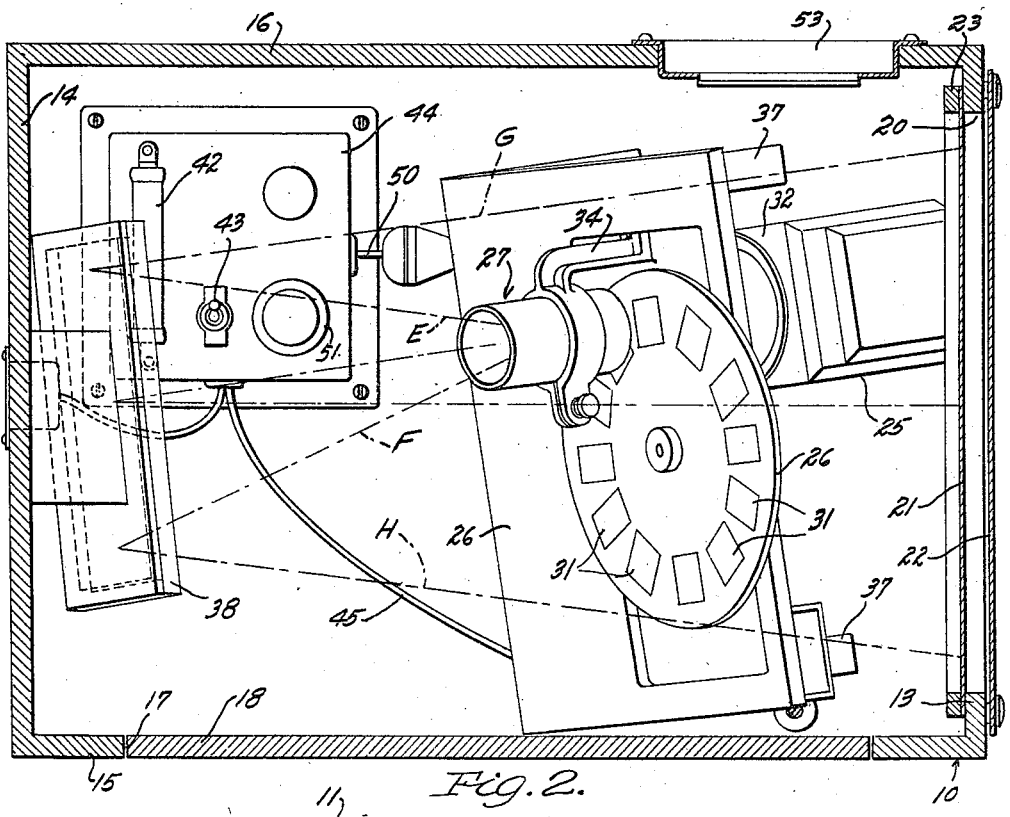
Fig. 2 is a plan view of the apparatus with the casing thereof in section.
Figure 3:
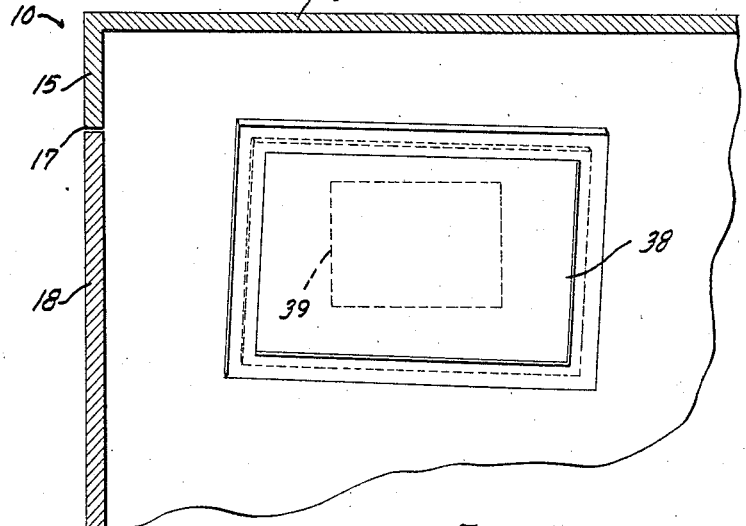
Fig. 3 is a detail view taken along the line and in the direction of the arrows 3—3 of Fig. 1.

A reflector 38, such as a rectangular mirror, is mounted within the casing 10 by a bracket 39, to the casing rear wall 14, adjacent the top wall 11 and is arranged with relation to the lens 27 to reflect the photographs onto the screen 21. As previously mentioned the rectangular screen 21 extends substantially entirely across the width of the casing 10, as shown in Fig. 2, so as to obtain as large a screen as possible, the height of the screen being determined by the projector apparatus which of course must not project into the reflected light rays. In order to provide a casing of substantially minimum width, the lens 27 and lamp 25 which are offset laterally from the center of the plate 26 are also offset laterally from the center of the screen 21. In order that the projected photographs will be properly reflected onto the screen 21 within the border thereof, and so that the light rays will impinge the screen in a plane coincident with the plane of the screen, the lens 27, lamp 25 and mirror are arranged at different compound angles with respect to the screen 21 and to each other.

Referring to Fig. 1, the pair of dot and dash lines A and B represent the light rays diverging from the focal point of the lens 27 toward and to the mirror 38 and from the mirror 38 the diverging dot and dash lines C and D represent the diverging light rays reflected onto the screen 21. The lens 27, plate 26, light opening and the mirror 38 are arranged at angles to the vertical such that the light is focused at the center of the mirror with the angle of incidence equal to the angle of projection. That is, the projector and reflector are angularly disposed relative to the vertical such that the sum of the length of lines A and C will be equal to the sum of the lengths lines B and D. Similarly, in the plan view of Fig. 2 dot and dash lines E and F represent the horizontal extremes of the diverging light rays from the lens 27 to the mirror 38 and dot and dash lines G and H represent the extreme horizontal diverging light rays reflected by the mirror onto the screen 21. The projector light, film plate 26, lens 27 and the mirror are angularly disposed to the horizontal such that the angle of incidence is equal to the angle of projection, or so that the sum of the lengths of lines E and G will be equal to the sum of the lengths of lines F and H. With the projector and mirror disposed at the proper compound angles or at angles both to the vertical and to the horizontal, it will be understood that by focusing the lens 27 all the reflected light rays will impinge the screen 21 in a plane coincident therewith and that the screen will be illuminated uniformly over its entire area.

The rotatable film plate 26 may be intermittently operated to successively and continuously present the radially spaced photogaph or films to the lens 27 by any suitable mechanism which may include, for example, a so-called Geneva motion mechanism and since intermittent operating mechanisms are well known and form no part of the present invention the operating mechanism is not herein shown in detail. The intermittent operating mechanism may be actuated by an intermittently energized solenoid 40, Fig. 1, which may be controlled by any suitable well known circuit breaker. In the casing rear wall 14 adjacent the bottom wall 12, there is an electric plug 41 for connecting to line and from the plug 41, lead wires in a protective sheathing lead to terminals of resistance 42, and a manual switch 43 which are mounted on and externally of an outlet box 44, secured to the casing bottom wall. From the switch 43, lead wires in a protective sheathing 45 lead to a plug 46 to which the electro-magnet or solenoid 40 is connected by lead wires 47 and 48. From the lamp 25, lead wires in a protective sheathing 50 lead to the outlet box 44 and are connected in circuit with the line via the external plug 41. Also mounted on the outlet box 44 is a rectifier tube 51 in circuit with the electromagnet to provide for use of the apparatus with either alternating or direct current.

In the casing bottom wall 12 there is an opening 52 and in the casing side wall 16 adjacent the top wall there is a grilled opening 53, these openings providing for circulation of air through the casing to reduce the temperature therein.

What we claim is:

Photographic projecting apparatus comprising a casing having front, side, bottom and rear walls, a pair of spaced brackets secured to the bottom wall, a base member mounted in the casing including a plate-like support mounted in the casing attached to said brackets at a compound angle, a light projector mounted on one side of said base member, a rotatable picture disk mounted on the opposite side of said base member, a lens tube bracket secured to the base member projecting forwardly and upwardly to be positioned in front of the picture disk and a lens carrying tube supported by said bracket whereby light rays may pass through an opening in the base-like member and through the picture disk to impose an image of said picture on one of the walls of the cabinet.

ALLAN V. DITTY.
ARTHUR J. BRADFORD.